(12) United States Patent
Clark et al.

(10) Patent No.: US 9,161,658 B2
(45) Date of Patent: Oct. 20, 2015

(54) SINGLE CUP BREWER

(75) Inventors: Charles H. Clark, Chatham, IL (US); Suresh Radhakrishnan, Chatham, IL (US)

(73) Assignee: BUNN-O-MATIC CORPORATION, Springfield, IL (US)

( * ) Notice: Subject to any disclaimer, the term of this patent is extended or adjusted under 35 U.S.C. 154(b) by 200 days.

(21) Appl. No.: 13/634,792

(22) PCT Filed: Mar. 14, 2011

(86) PCT No.: PCT/US2011/028395
§ 371 (c)(1),
(2), (4) Date: Sep. 13, 2012

(87) PCT Pub. No.: WO2011/115925
PCT Pub. Date: Sep. 22, 2011

(65) Prior Publication Data
US 2013/0004629 A1   Jan. 3, 2013

Related U.S. Application Data

(60) Provisional application No. 61/313,737, filed on Mar. 13, 2010.

(51) Int. Cl.
*A47J 31/00* (2006.01)
*A47J 31/54* (2006.01)
*A47J 31/06* (2006.01)
*A47J 31/44* (2006.01)
*A47J 31/46* (2006.01)

(52) U.S. Cl.
CPC .............. *A47J 31/54* (2013.01); *A47J 31/0663* (2013.01); *A47J 31/0673* (2013.01); *A47J 31/4467* (2013.01); *A47J 31/46* (2013.01)

(58) Field of Classification Search
CPC .............. A47J 31/0673; A47J 31/0663; A47J 31/0668; A47J 31/3695
USPC ............ 99/284, 295, 304, 306, 307, 305, 323
See application file for complete search history.

(56) References Cited

U.S. PATENT DOCUMENTS

| 3,092,012 | A | | 6/1963 | Ruhnke | |
|---|---|---|---|---|---|
| 3,793,934 | A | | 2/1974 | Martin et al. | |
| 4,094,233 | A | * | 6/1978 | Martin | 99/305 |
| 4,995,978 | A | | 2/1991 | Van de Gang | |
| 5,285,717 | A | * | 2/1994 | Knepler | 99/282 |
| 5,634,394 | A | * | 6/1997 | Cortese | 99/295 |

(Continued)

OTHER PUBLICATIONS

Search Report & Written Opinion issued in app. No. PCT/US2011/028395 (2011).

*Primary Examiner* — Reginald L Alexander
(74) *Attorney, Agent, or Firm* — Barnes & Thornburg, LLP (57) ABSTRACT

A beverage making apparatus including a housing containing a water system. The water system includes a heated water reservoir and a pour-in basin for receiving water. The pour-in basin is connected to a water pump which pumps water from the basin to the heated water reservoir. Water from the heated water reservoir is moved to a spray head for dispensing to a beverage brewing substance retained in either at least one of a pod format or a cartridge format. A pair of conductance probes are contained in the fill basin to indicate the status of water in the fill basin. The brewer is designed for use with multiple beverage making substance holders so that multiple beverage substance formats can be used with the brewer.

15 Claims, 13 Drawing Sheets

(56) References Cited

U.S. PATENT DOCUMENTS

| | | | |
|---|---|---|---|
| 5,829,340 A * | 11/1998 | Yang | 99/290 |
| 5,870,943 A * | 2/1999 | Levi et al. | 99/287 |
| 7,350,455 B2 | 4/2008 | Vetterli | |
| 7,770,512 B2 * | 8/2010 | Albrecht | 99/295 |
| 2003/0071056 A1 | 4/2003 | Hale | |
| 2007/0175335 A1 | 8/2007 | Liverani et al. | |
| 2008/0011865 A1 | 1/2008 | Goeckner | |
| 2009/0220650 A1 | 9/2009 | Ozanne | |
| 2010/0077928 A1 | 4/2010 | Schmed et al. | |
| 2011/0200726 A1 * | 8/2011 | Tinkler et al. | 426/431 |
| 2013/0189400 A1 | 7/2013 | Pribus et al. | |

* cited by examiner

SINGLE CUP BREWER

CROSS-REFERENCE TO RELATED APPLICATIONS

This patent application is a U.S. nationalization under 35 U.S.C. §371 of International Application No. PCT/US2011/028395, filed Mar. 14, 2011, which claims the benefit of priority under 35 U.S.C. §119(e) to U.S. Provisional Application No. 61/313,737, filed Mar. 13, 2010. The disclosures set forth in the referenced applications are incorporated herein by reference in their entireties, including all information as originally submitted to the United States Patent and Trademark Office.

BACKGROUND

Beverage making apparatus has been produced which include a reservoir for holding a portion of heated water. The reservoir includes an inlet into the reservoir and an outlet from the reservoir and a heating element in association with the reservoir. Water is supplied to the reservoir, heated, and then moved to a spray head for dispensing over a beverage making substance. Heated water dispensed over the beverage making substance infuses the substance and produces a beverage.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying at least the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

Figure 1:
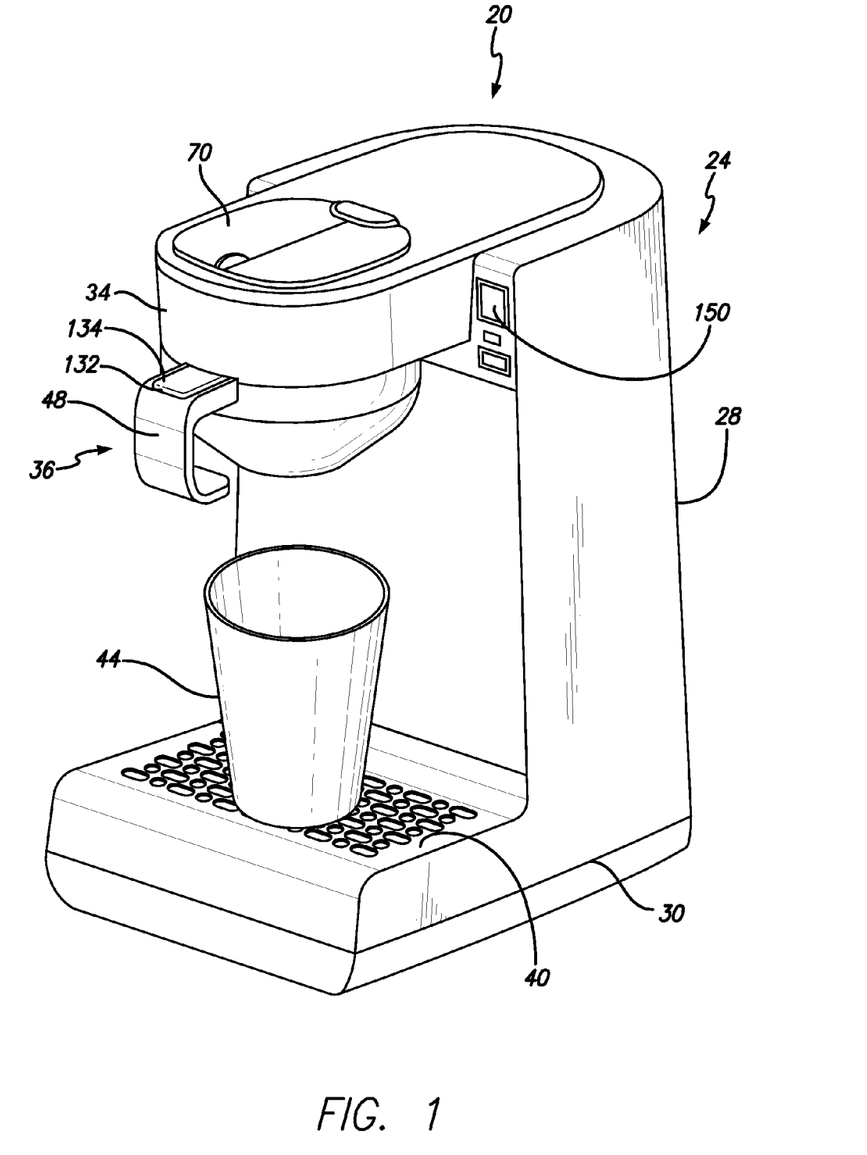
FIG. 1 is a perspective view of a single cup brewer which includes a housing have a body extending from a base and a hood extending from the body, a brewing substance holder is provided and removably attachable to an engagement area of the hood, a cover is provided over a portion of the hood which receives water therein for use in the beverage making process.

As shown in FIG. 1, a brewer 20 includes a housing 24 having a body 28 extending above a base 30. A hood 34 extends from the body 28 over a portion of the base 30. A beverage substance holder or holder 36 is retained underneath a portion of the hood 34. The base 30 includes a drip tray 40 on top of which a cup or container 44 may be placed. The container 44 is position underneath the beverage substance holder 36 so that when the brewer 20 operates a brewing cycle a volume of beverage is dispensed from the holder 36 into the cup there below.

Figure 2:
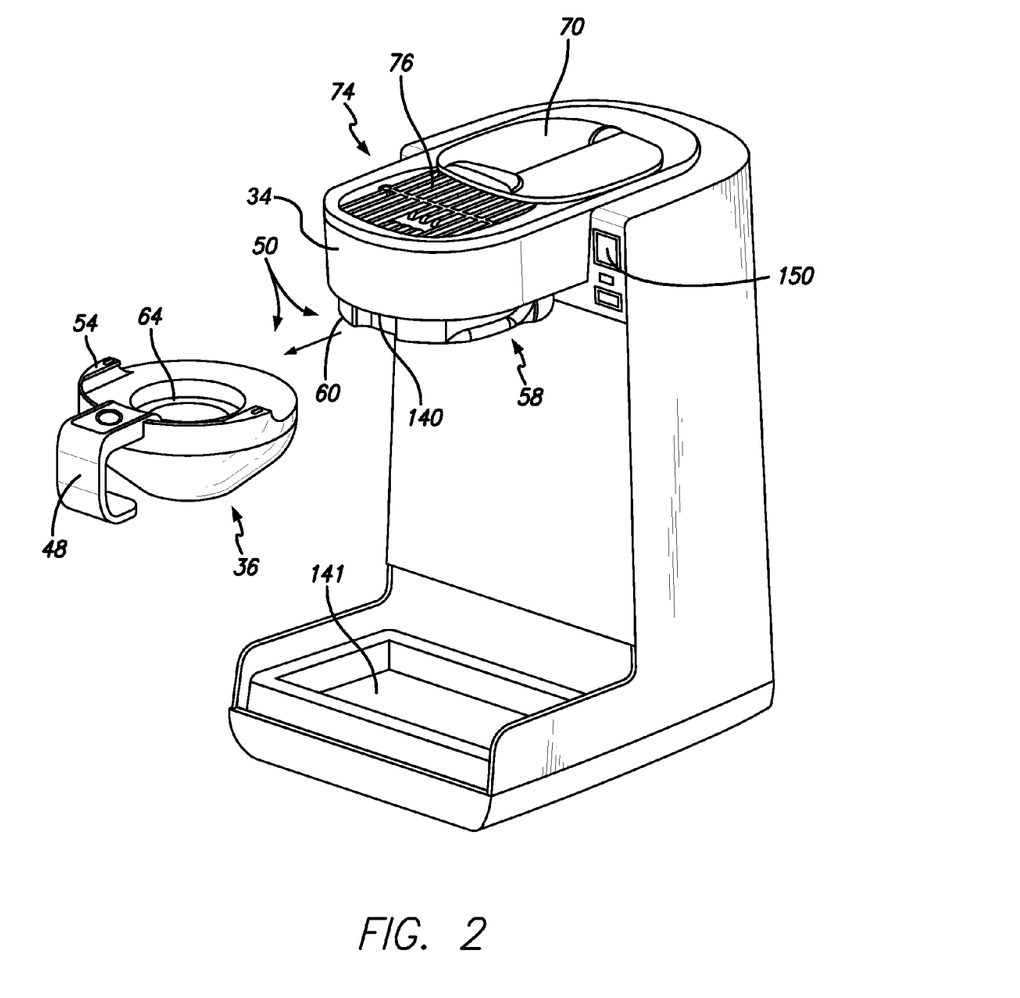
FIG. 2 is a perspective view of the brewer in which the holder has been removed from the engagement area to reveal a cavity for receipt of a brewing substance, the cover has been displaced from the holder to reveal a filling area, a drip tray area has been removed to reveal a collection area.
Figure 3:
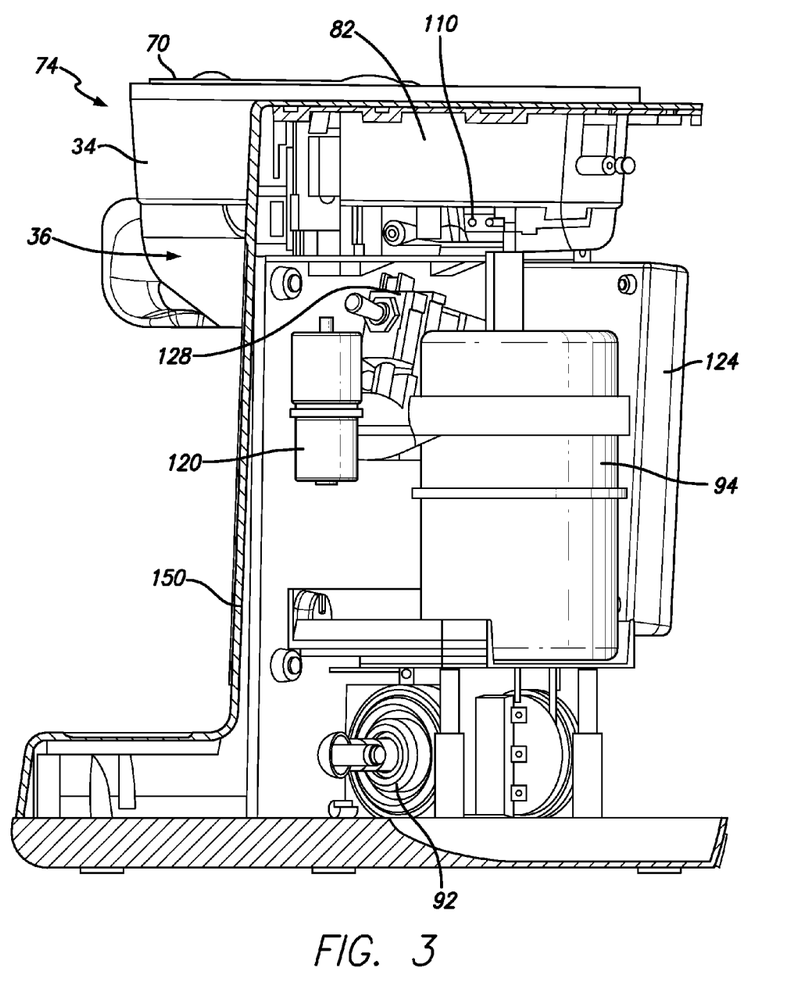
FIG. 3 is a rear perspective view which has been partially fragmented to reveal various components within the body of the housing including the heated water reservoir, fill basin, controller, air pump, water pump, and related structures.

In FIG. 2, the holder 36 has been removed from the hood. A handle 48 attached to the holder 36 used to grip the holder for removal from and attachment to the brewer. An engagement assembly 50 includes rails 54 on the holder 36 and corresponding engagement ribs 58 on an engagement area 60 of the hood 34.

In the exploded view of FIG. 2, the holder 36 reveals a cavity 64 which is positioned in the holder for retaining a beverage brewing substance. The substance may be retained in a pre-packaged manufactured "pod". Pods are manufactured of a filter material which allows water to flow there through. When packaged with brewing substance between layers of filter material, a pod can be used to brew a selected beverage.

Figure 10:
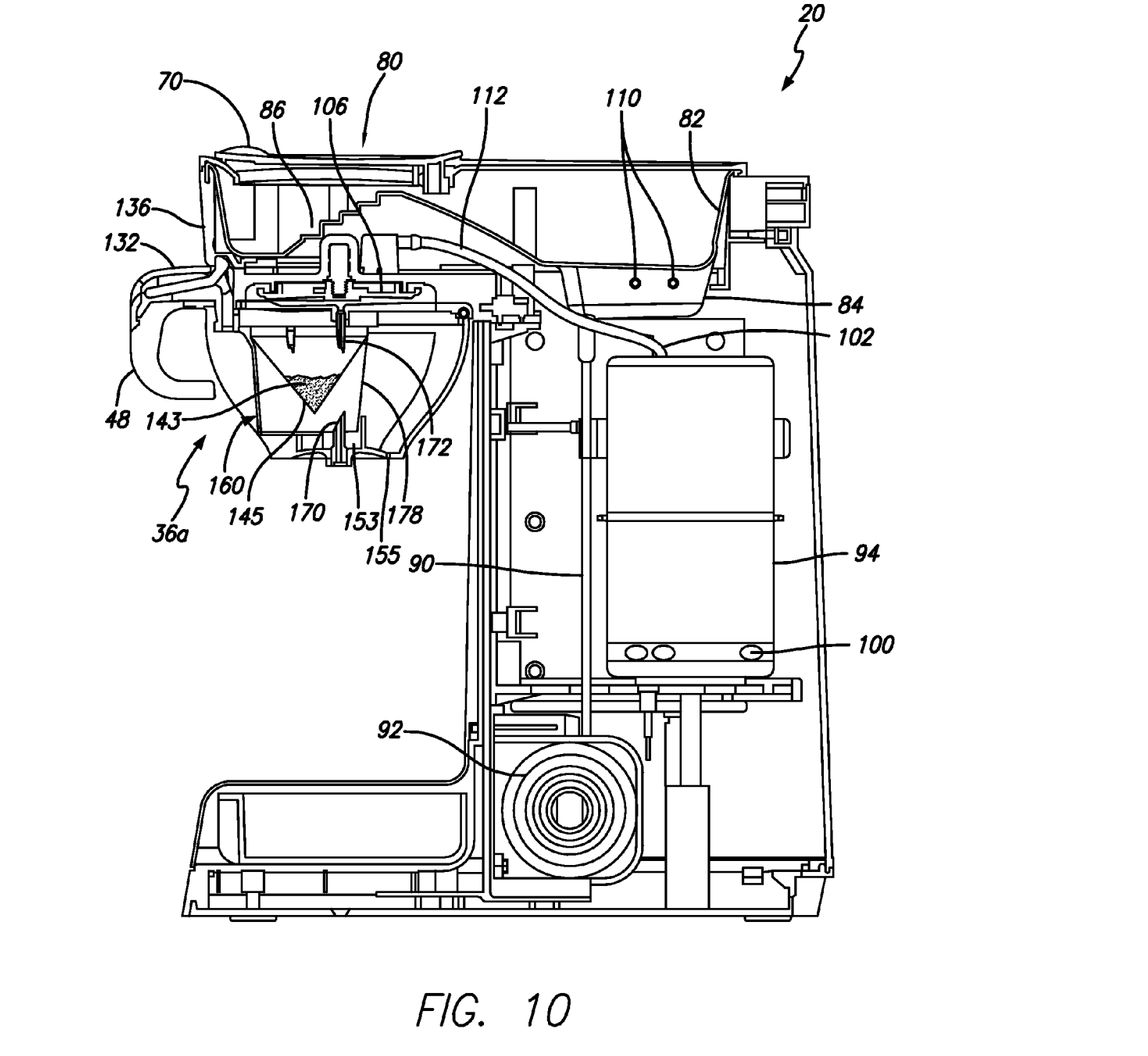
FIG. 10 is a side elevational cross-sectional view of the brewer with the pre-packaged beverage brewing cartridge retained in the holder for use in the brewing process.

As shown in FIGS. 1 and 2, a cover 70 is provided on the hood. FIG. 2 shows the hood in which the cover 70 has been displaced. The cover 70 is designed to swivel or tilt relative to the hood. As shown in FIG. 2, the cover 70 has been rotated to reveal a filling opening 74 or mouth. Water used in the brewing process is poured through the mouth into a basin below a filling grill 76. With reference to FIG. 10, water 80 is poured through the opening 74 once the cover is removed there from. Water flows into a fill basin 82. The water collects in the fill basin 82 first filling a lower portion of reservoir 84.

As the water fills the basin 82 it reaches a level which can be measured by the measuring features 86. The measuring features 86 are a series of defined horizontal levels associated with selected volumes of water in the basin. This allows a user to look through the mouth 74 and grating 76 to determine the various measurements on the measuring features 86. This allows a user who has not selected a pre-measured amount of water to pour into the basin to use the measuring features as a guide. In other words, the upper feature may indicate 14 ounces of water whereas a lower feature may indicate 6 ounces of water with the other features in between providing additional measuring indicia.

The lower basin or area 84 is provided so that water poured into the basin 82 will continue to drain to the lowest area 84. Water flows from the lower basin 84 through a tube 90 to a water pump 92. The water pump pumps the water to the heated tank 94. Water is discharged from the pump 92 into the tank 94 in a lower area which includes a heating element 100. Water fills the cavity of the tank 94. Continued pumping of the water pump 92 pushes water out through the top 102 which connects to a spray head 106. Water is pumped by the pump 92 into the tank 94 until there is an indication that basin 82 is substantially drained. As water is pumped by the pump 92 through the tank 94 it displaces water already in the tank so that water can be provided on demand. In other words, heated water is retained in the tank 94 and is displaced upon activation of a pump. This helps to reduce the time a user has to wait for the heated water to be dispensed by a spray head.

Figure 4:
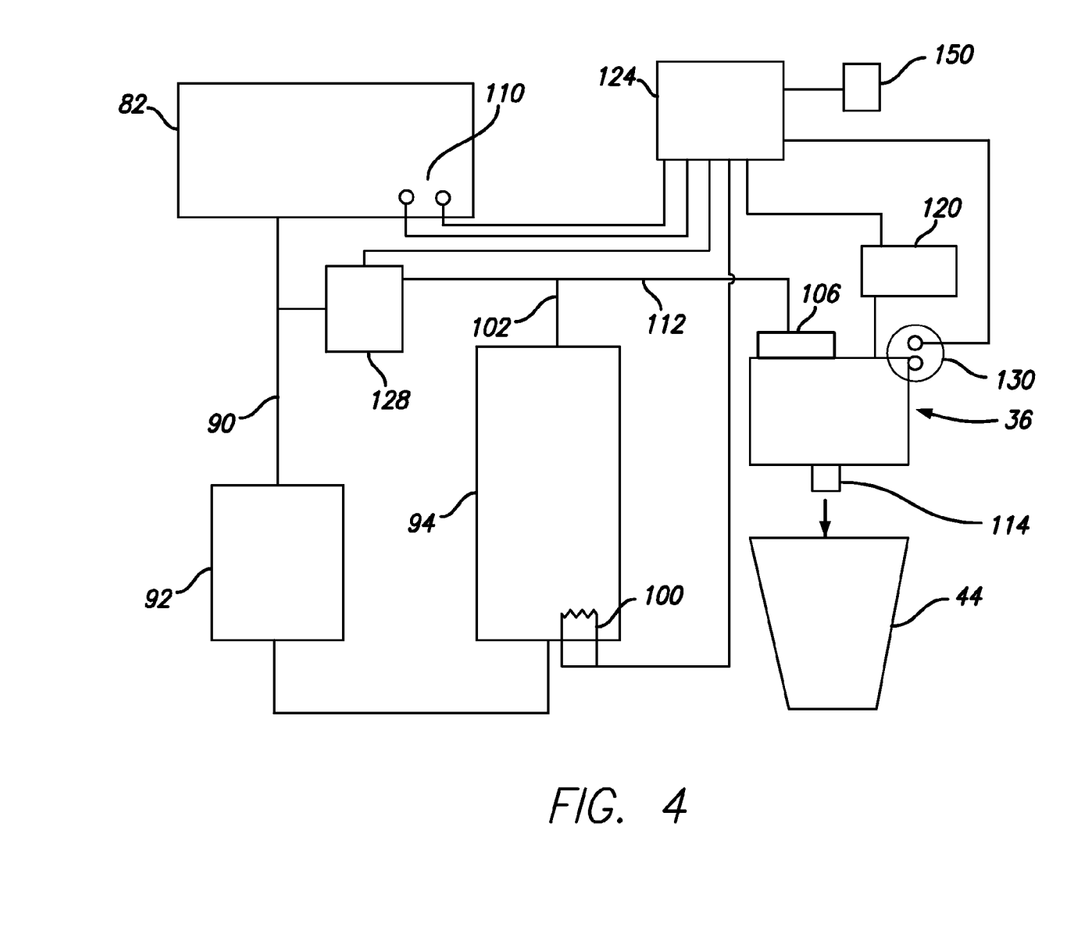
FIG. 4 is an illustrative general schematic diagram showing the overall brewing system of the brewer.
Figure 5:
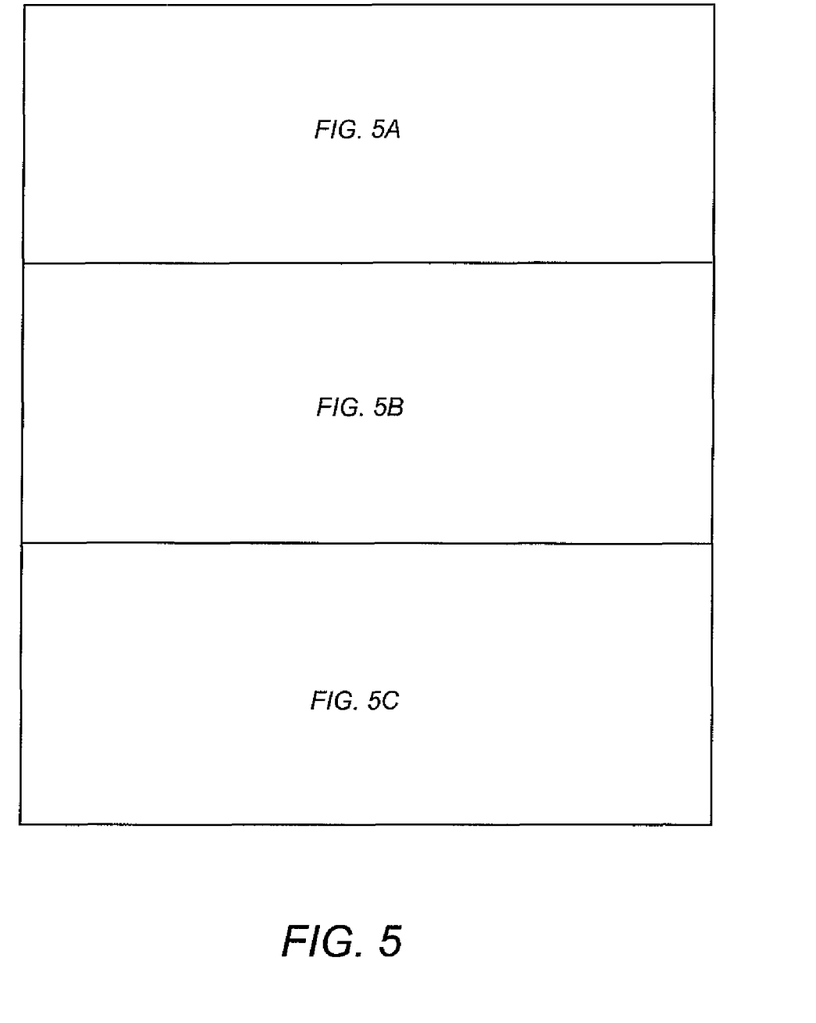
FIG. 5 is a drawing showing the relationship of the exploded illustrations of FIGS. 5A, 5B, and 5C.
Figure 5A:
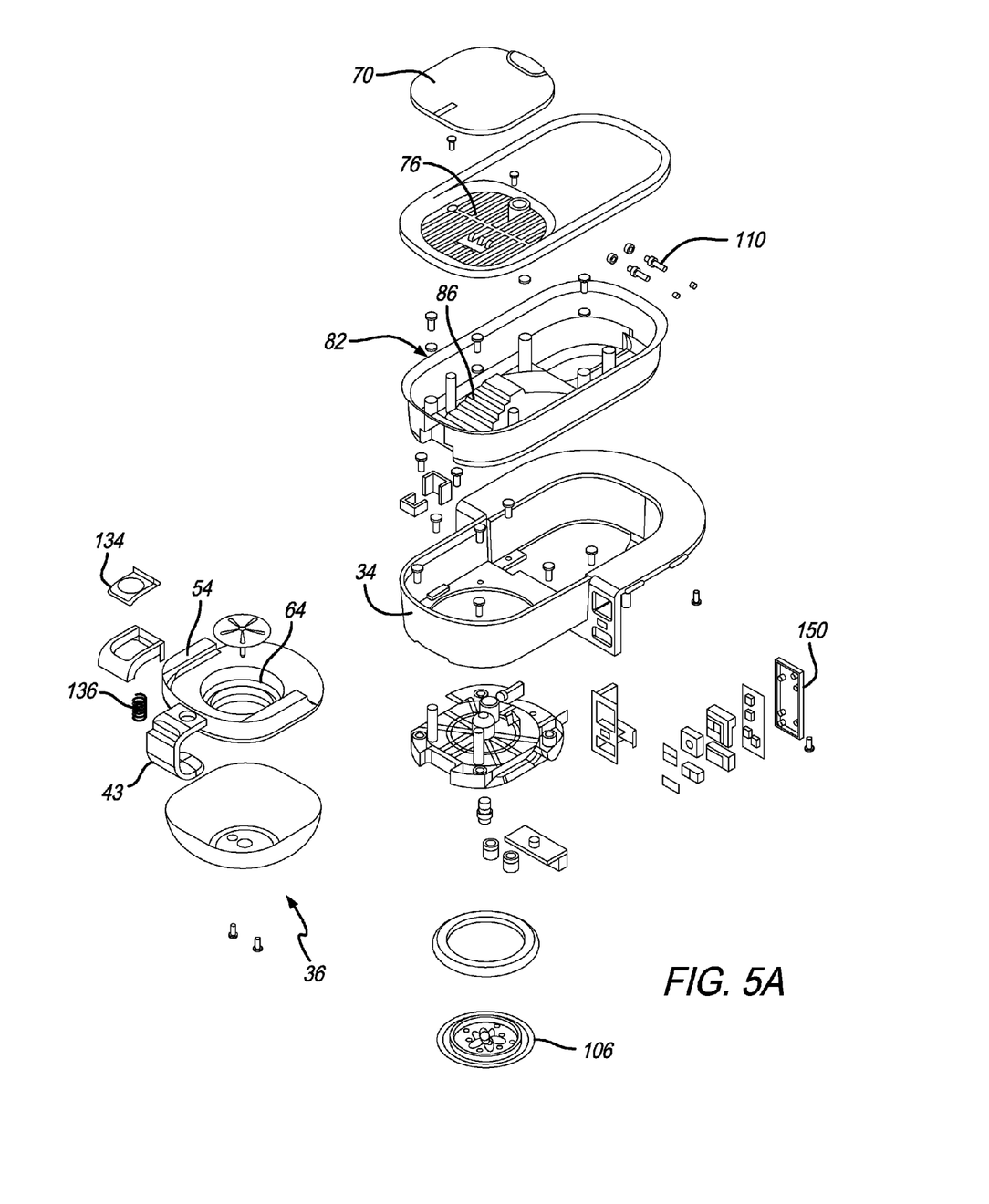
FIG. 5A is an enlarged exploded view of a portion of the brewer including the pour-in basin, spray head, control switch assembly and holder assembly shown in an exploded view relative to other views as shown in FIG. 5b and FIG. 5c.
Figure 5B:
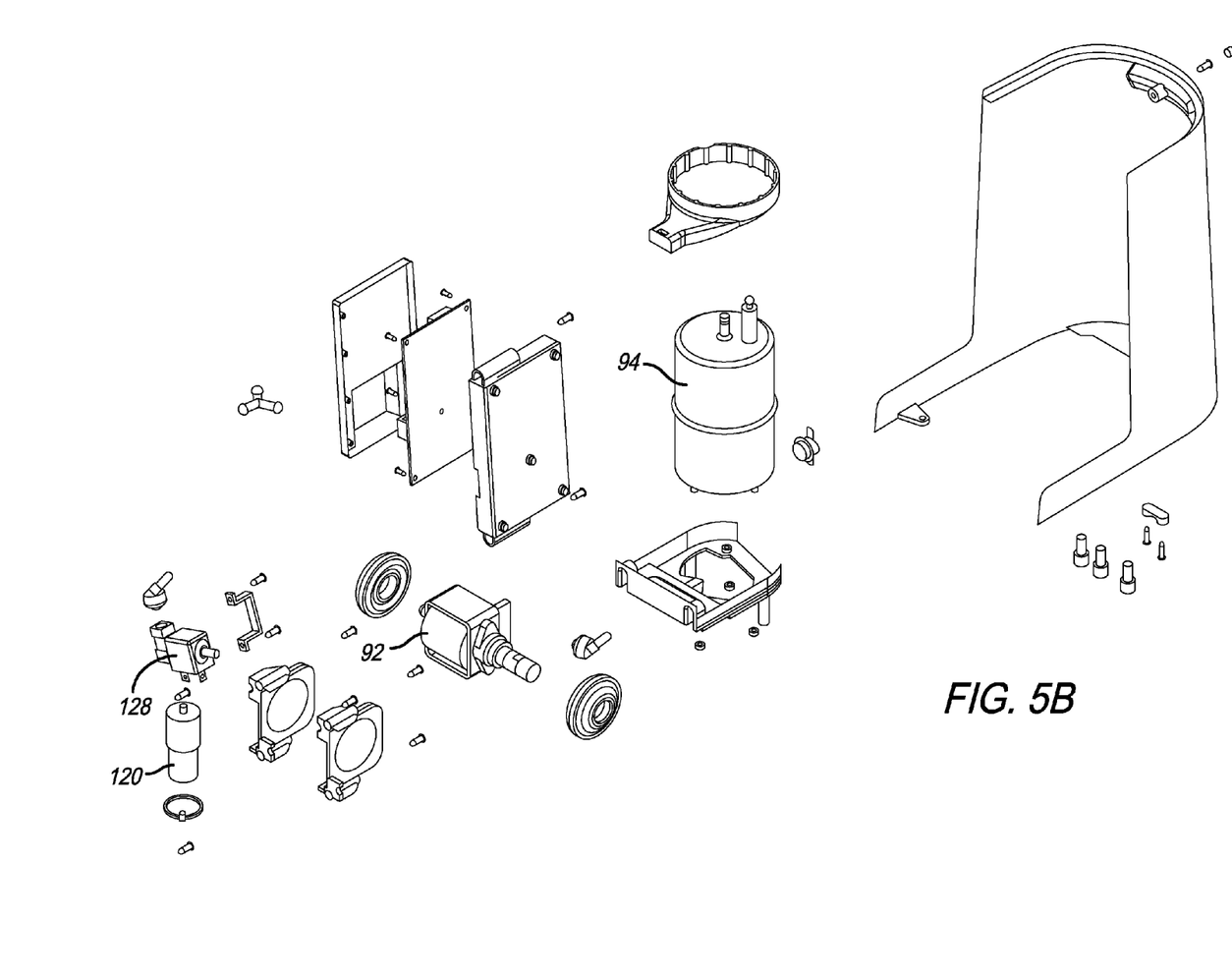
FIG. 5B shows an exploded view of a water moving assembly including a water pump, heated water reservoir, air pump and vent valve which operate to move water and air through the brewer during operation.
Figure 5C:
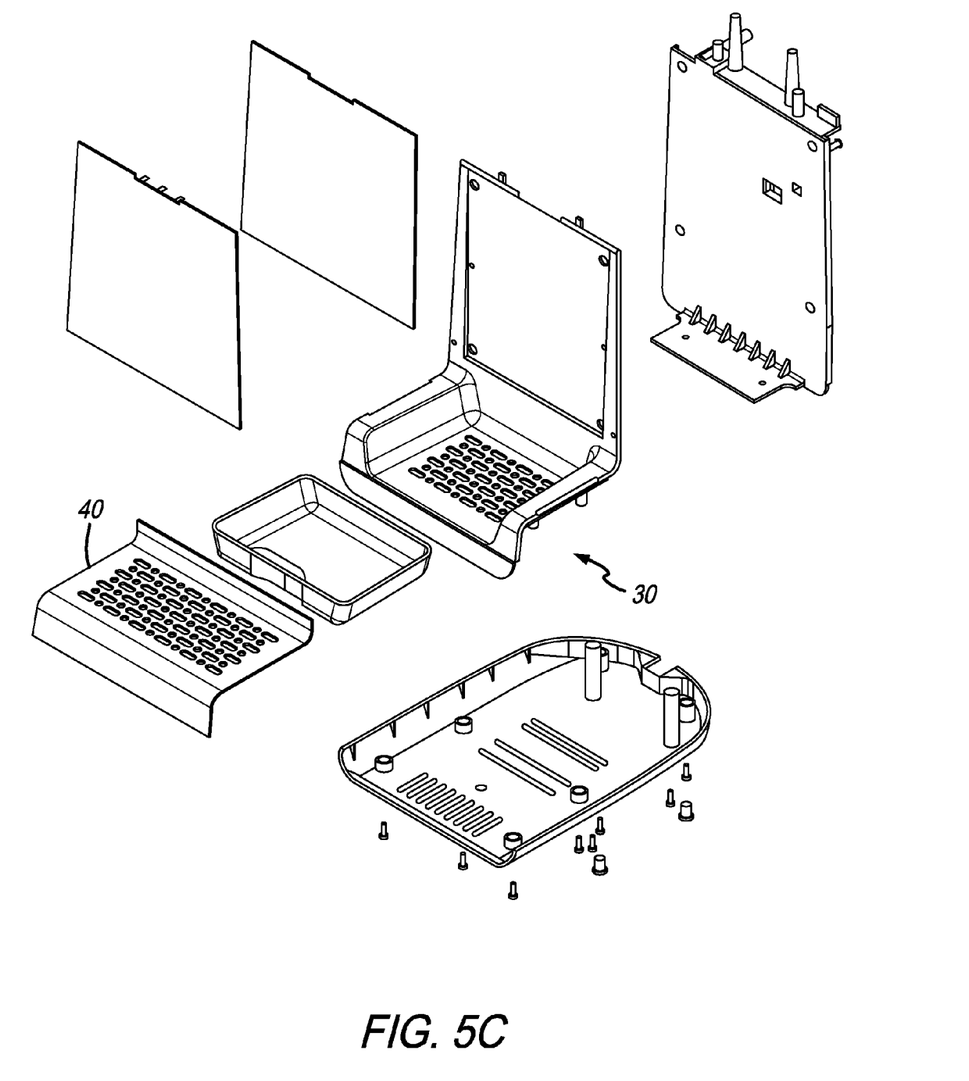
FIG. 5C is an exploded view of the brewer housing which has been exploded to reveal other components contained therein, FIGS. 5A, 5B and 5C providing a combined exploded view of the entire brewer assembly.

With further references to FIGS. 4 and 5A and 5B, conductance probes 110 are positioned in the reservoir for detecting the presence, absence and/or level of water in the lower basin 84. It should be noted that while a pair of conductance probe 110 is illustrated, a variety of other sensing devices may be used.

With reference to FIG. 4, operation of the brewer includes pouring water into the fill-in basin 82 and movement of the water by the water pump 92 to the tank 94. Heated water is displaced from the tank 94 and dispensed though the water line 112 to a spray head 106 positioned above the holder 36. Water is dispensed into a pod or other making substance container retained in the holder for producing a brewed beverage which is dispensed from the nozzle 114 of the holder to the container 44 there below. At the end of the brewing cycle an air pump 120 is activated to expel at least some of the moisture retained in the holder at the end of the brewing cycle.

The diagrammatic system illustration of FIG. 4 shows that the conductance probes 110 are connected to a controller 124. The controller 124 is also coupled to the air pump 120, water pump 92, to valve 128, and heating element 100 associated with heated water tank 94. A sensor assembly 130 is associated with the holder 36. The sensor assembly 130 is coupled to the controller 124 to prevent operation of the brewer unless a predetermined condition is detected by the sensor assembly. The sensor assembly is associated with the handle 48. The handle includes a locking assembly 132, shown in greater detail in FIG. 12. The locking assembly 132 includes a locking button 134 which is spring loaded into a locked position with a spring 136. The locking button 134 engages a corresponding portion of the hood 140 or locking hasp. Engagement of the button 134 with the hasp 140 will result in operation of the sensing assembly 130. If the engagement assembly 50 is properly engaged with the rails 54 engaging the ribs 58, the holder 36 will be positioned for operation of the brewer. The positioning condition will be detected by the sensor which will provide a signal to the controller 124. When the controller 124 senses a signal the brewer will be operable.

During the brewing cycle, the volume of water to be used for brewing is poured into the basin 82. Once the user activates a brewing switch 150 coupled to the controller 124, the system will check for positioning of the holder 36 as detected by the sensor assembly 130. If the sensor assembly 130 provides a predetermined signal, water pump 92 will be activated. The pump will initiate a pumping cycle to deliver water to the tank 94. The heater 100 will also be activated to heat incoming water. Since the heated water tank 94 retains a volume of heated water, the introduction by the water pump 92 of additional water will displace heated water from the reservoir through the water line 112 to the spray head 106.

The water pump 92 will continue to operate for a period of time as controlled by the controller 124. The pump 92 will stop operating when the controller provides a signal indicating that water in the pouring basin has reached a predetermined level. The predetermined level is sensed the conductance probes. When the conductance probes 110 are submerged in the basin 82 there will be a signal indicating the presence of water in the basin. When the water level in the basin 82 drops below the conductance probes 110, the pump 92 will operate for a predetermined period of time beyond the signal. This will help to assure the water in the basin will be drained from the basin. Alternatively, the pump 92 can continue to operate only while the conductance probes are submerged. In other words, once there is no water bridging the space between the conductance probes, the pump may be stopped. This may allow some residual portion of water to remain in the basin to provide priming water on the next dispensing cycle.

As shown, a pair of conductance probes 110 are used in the fill basin 82 of the brewer 20. The probes 110 are generally horizontally spaced in the pour-in bowl. They are spaced generally close to each other but far enough apart to prevent unintentional bridging of water there between. In other words, if the probes are too close, water may bridge even though the overall volume of the water in the basin 82 is dropped below the conductance probes. By spacing the probes 110 horizontally, an indication of a water level in the basin can be provided. By positioning the probes 110 in the lower portion of the reservoir in the lower basin 84, an indication of the end of cycle water condition can be provided. The conductance probes 110 operate by providing an electric signal there between. Water in the basin bridges the two probes thereby completing the circuit. When the water drops below the probes the circuit is opened and the low water condition is detected.

With reference to FIGS. 6-11, an alternate embodiment of the holder 36a, a cartridge holder 36a, which is removable from the brewer, is shown. The holder 36a is completely compatible with the brewer so that a user may choose whether to use pods or cartridges. If the user has a favorite type of coffee packaged in a cartridge form he can use this brewer to brew the coffee. If the same user or another user of the machine has a favorite type of tea packaged in a pod, he can use this brewer by merely using a different holder. This allows the brewer to be used by several different users, in a home or office setting, and multiple brewing container formats.

Figure 6:
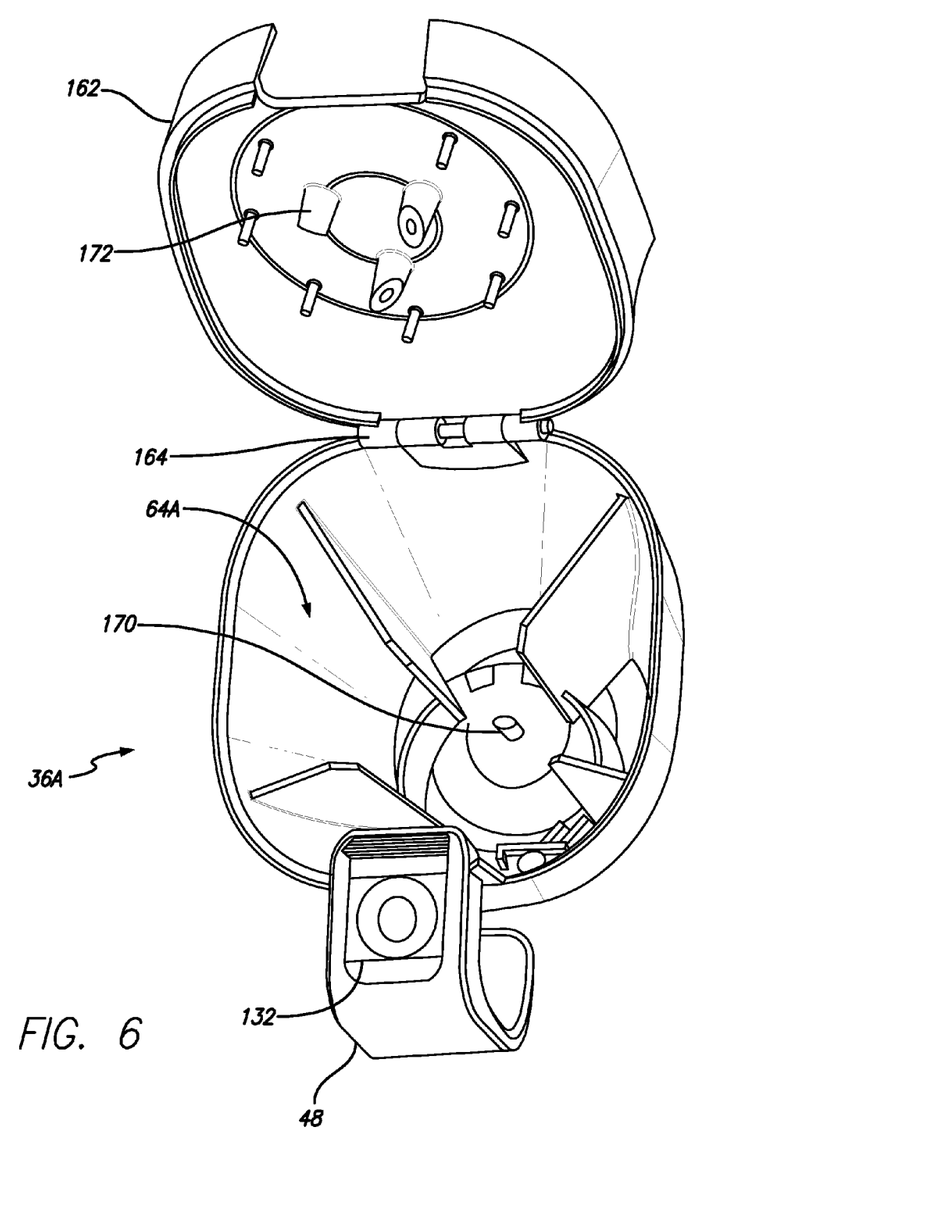
FIG. 6 is a perspective view of a holder which is used for holding a pre-packaged filter cartridge cup containing brewing substance with a cover displaceably attached to a corresponding holder defining a cavity for receiving the cartridge.
Figure 7:
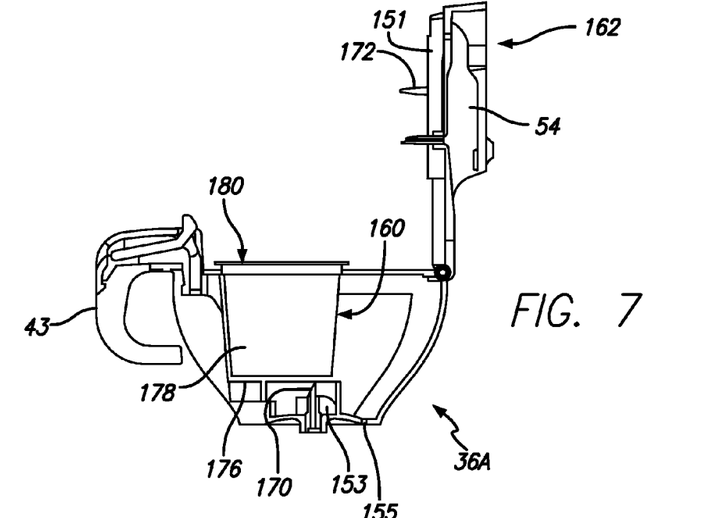
FIG. 7 shows a partial fragmentary side elevational view of a holder with a cartridge (not in cross section) placed therein and shows the first of a series of progressions in which the cartridge is engaged in the holder for use during a brewing process.

As shown in FIG. 6, the cartridge holder 36a includes a cavity 64a for receipt of a pre-packaged beverage cartridge cup 160. A cover 162 is provided and attached to the holder 36a with a hinge 164. As shown in these figures, rails 54 are provided on the cover 162. When the cover is positioned over the holder 36a the assembly can be positioned upon the engaging ribs 58 of the brewer 20 shown in the preceding figures.

Figure 8:
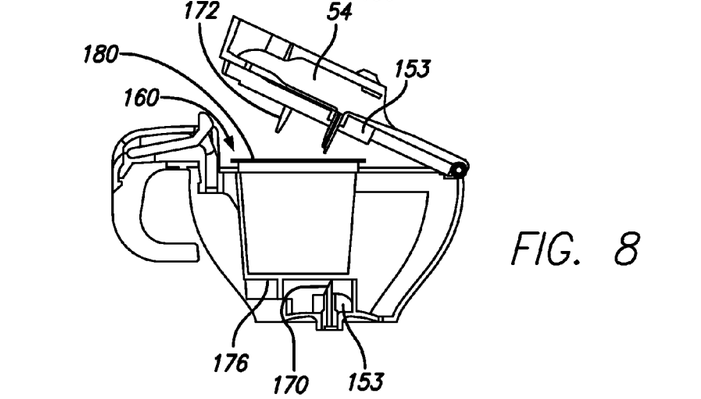
FIG. 8 shows the view of FIG. 7 in which a cover has been advanced to a position over the top surface of the cartridge (not in cross section) and in which the surfaces of the cartridge have not been pierced by multiple cannulae retained on the cover and in the cavity of the holder.
Figure 9:
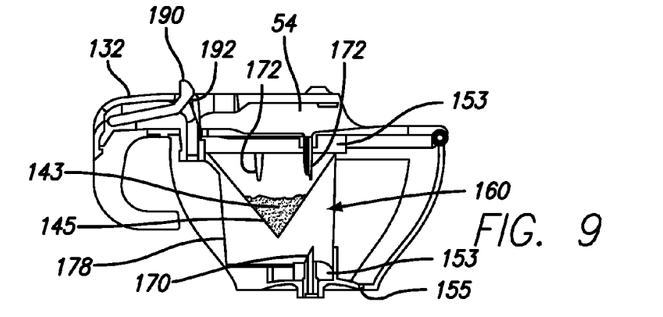
FIG. 9 is a view of the illustrations of FIGS. 7 and 8 in which the cover has been positioned over the cartridge with the multiple cannulae piercing corresponding surfaces of the cartridge for delivering water to a brewing substance retained in the filter portion of the cartridge, and the holder having a compatible engagement structure for retention on the engagement area of the hood.

The holder 36a includes a drain cannula 170. The cover 162 includes at least one water inlet cannula 172 and may include a group of multiple cannulae. As shown in the progressions in FIGS. 7, 8 and 9 the cartridge 160, having a generally known construction, is positioned in the holder 36a. When positioning the cartridge in the holder the base of the cartridge 176 will be positioned above the tip of the corresponding drain cannula 170. In other words, the bottom surface of the cartridge is not yet pierced. The drain cannula 170 may be provided with a larger diameter than the water inlet cannula 172. Also, the body 178 of the cartridge is formed of a more rigid plastic material compared to the cover 180 of the cartridge which is generally formed of a lower tear resistance plastic, foil or multilayer food packaging material. With reference to FIG. 8, the cover 162 is positioned over the cartridge 160. In the transition from FIG. 8 to FIG. 9, the cannulae 172 and 170 will either puncture the top 180 and bottom 176 simultaneously or the top cannulae 172 will puncture the top 180 before the drain cannula 170 punctures the bottom 176.

FIGS. 9-12 show the final condition of the cartridge 160 positioned in the holder 36a and punctured for brewing. A pliable sealing material or structure 151 is provided surrounding the upper cannulae 172 to provide some degree of interface to reduce leakage or seepage of water dispensed into the cartridge though the upper cannulae 172. Similarly, the pliable material or structure 153 is provided proximate the lower cannula 170 to provide some degree of interface to reduce leakage or seepage of beverage dispensed from the cartridge though the lower cannula 170.

Figure 12:
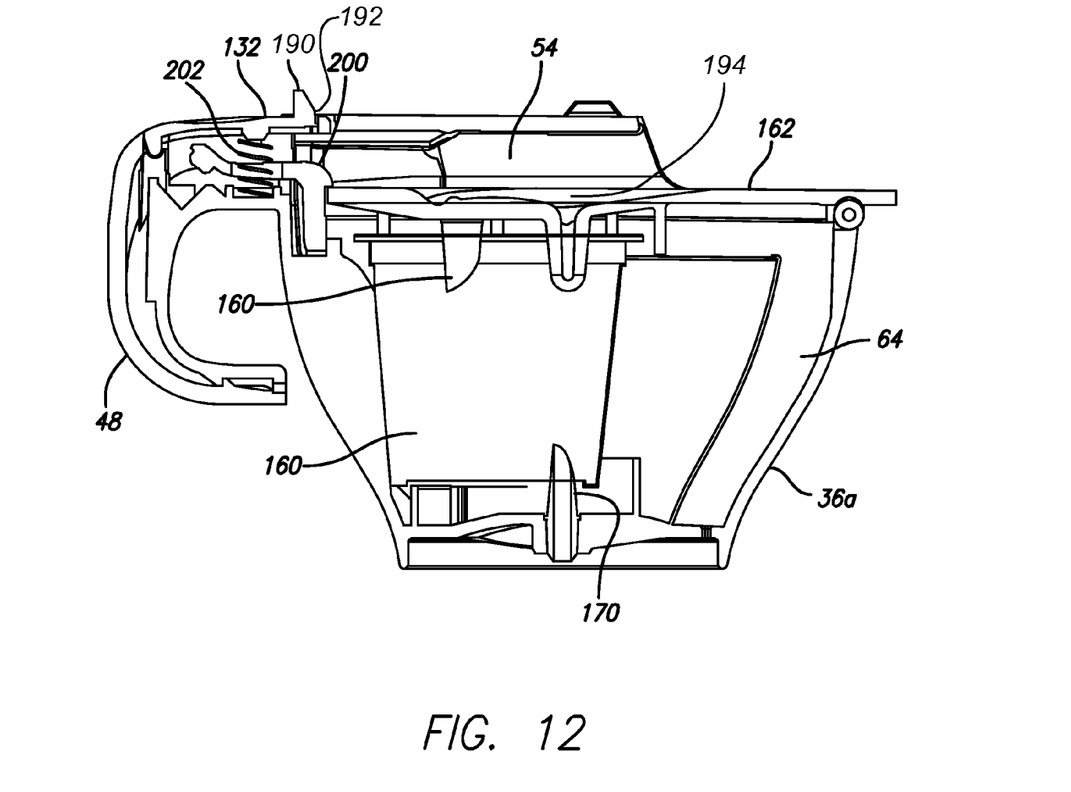
FIG. 12 is an enlarged cross-sectional view of the holder.

As shown in FIG. 12, the locking button 132 provides a function of retaining the cover on the holder and engagement of the holder on the engaging rib 58. An upstanding finger 190 of the button is used to engage the hasp 140 of the brewer. The leading edge 192 of this finger helps to retain the cover 162. The cover is not sealed to the holder, and is merely positioned over the mouth of the holder as shown in FIG. 12. Also, the rim of the cartridge is not captured between the cover and the holder. A hook 200 holds the cover over the holder. The button 132 is spring loaded by the spring 202. The finger 190 engages the hasp. Operation of the button 132 to remove the holder from the brewer can also be used, with a separate action, to release the cover by disengaging the hook 200 from the cover.

Figure 11:
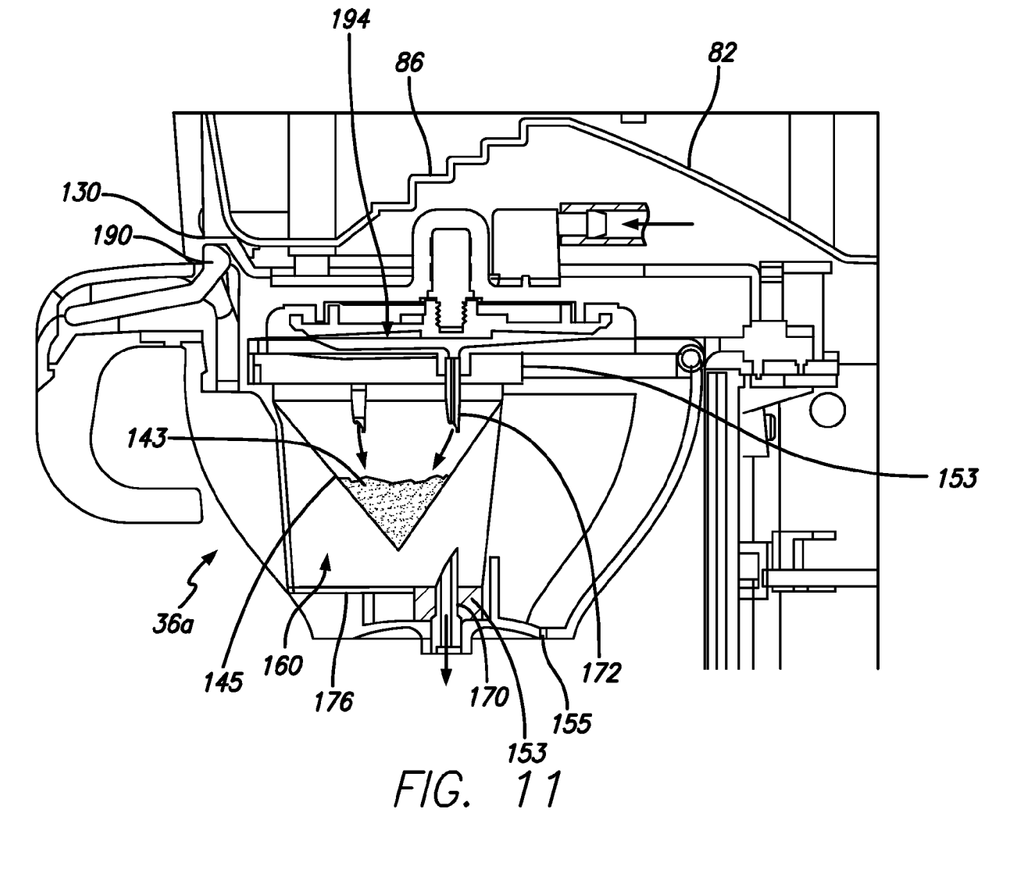
FIG. 11 is an enlarged cross-sectional view as shown in FIG. 10 showing the holder position below and mating with a spray head for delivering water to the holder system, the spray head is the same spray head that us used for distributing water over a pod retained in a pod holed configured for attachment to the same brewer.

FIGS. 10 and 11 show the holder 36 retained on the brewer 20 for brewing. In this position, a collection area 194 of the cover 162 communicates with the spray head. In this regard, the spray head is designed to distribute water over a pod as used in the holder 36 as shown in FIGS. 1-5C. The collection area 194 allows the water distributed by the spray head to be collected and directed through the corresponding multiple water inlet cannulae 172.

The multiple cannulae facilitate distribution of water into the cartridge and agitation of substance retained in the cartridge. The multiple cannulae may be generally evenly spaced relative to only another and the group of multiple cannulae are spaced inwardly away from the outer edge of the cartridge. This is because the cartridge may be fabricated with a filter material inside the cartridge which retains the beverage making substance. Water is then dispensed through the top 180 for mixing with the beverage brewing substance 143 in the filter material 145. Beverage drained from the beverage making substance through the filter material and collects in the lower portion of the body 178 of the cartridge and drains through the drain cannula 170. In other words, the spray head can be used for brewing beverages using both a pod retained in the holder 36 and a cartridge retained in the cartridge holder 36a. This provides a brewer which can be used with multiple beverage substance holding formats.

It should be noted that the present disclosure may refer to coffee in reference to beverage making substance throughout the description in the interest of clarity and simplicity. It will be understood, however, that any form of beverage making substance may be used to produce a beverage and the term coffee or beverage making substance is intended to be broadly interpreted. This broad interpretation is also intended to include, but is not limited to, beverage substances including but not limited to, coffee, tea, herbs, botanicals, liquid beverage concentrate, ground, pulverized, rough cut, whole, powdered beverage concentrate, flaked, granular, freeze dried or other forms of materials including, but not limited to, liquid, gel, crystal or obtain a beverage or other food product or any other forms of beverage substance or food products.

Terms including beverage, brewed, brewing, brewing substance, brewed liquid, and brewed beverage as may be used herein are intended to be broadly defined as including, but not limited to, the brewing of coffee, tea, and any other beverages. This broad interpretation is also intended to include, but is not limited to, any process of dispensing, infusing, steeping, reconstituting, diluting, dissolving, saturating or passing a liquid through or otherwise mixing or combining a beverage substance with a liquid such as water without limitation to the temperature of such liquid unless specified. While a heated liquid is referred to herein it should be understood that reference to temperature is provided by way of illustration and not limitation and should be broadly interpreted. It should be understood that a beverage may be made to accommodate a recipe using heated, unheated, chilled or liquid within any range of temperature. Also, the volume or quantity of the beverage making substance used in the system or the beverage produced by the system is intended to be broadly interpreted and not limited to that as specifically disclosed and includes serving sizes ranging from single cup to multiple cup containers.

While this disclosure has been described as having exemplary embodiments, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A beverage making apparatus comprising:
   a body having a base with a hood portion extending from the body over at least a portion of the base;
   a water heating and dispensing system positioned in at least a portion of the body for receiving water, heating the water, and dispensing the water;
   a controller coupled to the water heating and dispensing system to controllably heat and dispense water for use in making a beverage;
   at least two beverage substance holders provided with the beverage making apparatus for selective attachment to and removal from the hood portion, one at a time, each of said beverage substance holders retaining at least one different beverage making substance format, one at a time, and for receiving heated water into the beverage making substance for producing a beverage therefrom;

wherein the at least two beverage substance holders including one holder for receiving and retaining a beverage substance pod, and one holder for receiving and retaining a beverage substance cartridge, and wherein the holder for receiving and retaining a beverage substance pod communicates directly with the water heating and dispensing system and the holder for receiving and retaining a beverage substance cartridge includes a structure which adapts the holder for use with a cartridge and includes at least one probe for piercing at least one portion of the cartridge for producing a beverage therefrom.

2. The beverage making apparatus of claim 1, further comprising a fill water basin being sized and dimensioned for receiving a volume of water approximately equal to one serving of beverage.

3. The beverage making apparatus of claim 1, further comprising a pair of conductance probes coupled to the controller and positioned spaced apart in the water heating and dispensing system to detect a condition of water for controllably moving water for use in making a beverage.

4. The beverage making apparatus of claim 2, further comprising measuring features, the features being positioned in the fill water basin for providing a visual indication of the volume of water placed in the basin.

5. The beverage making apparatus of claim 2, further comprising a mouth defined in the hood communicating with the fill water basin, a displaceable cover being displaceably retained on the hood relative to the mouth.

6. A beverage making apparatus comprising:
a body having a base with a hood portion extending from the body over at least a portion of the base;
a water heating and dispensing system positioned in at least a portion of the body for receiving water, heating the water, and dispensing the water;
a controller coupled to the water heating and dispensing system to controllably heat and dispense water for use in making a beverage;
at least two beverage substance holders provided with the beverage making apparatus for selective attachment to and removal from the hood portion, one at a time, each of said beverage substance holders retaining at least one different beverage making substance format, one at a time, and for receiving heated water into the beverage making substance for producing a beverage therefrom;
further comprising a fill water basin being sized and dimensioned for receiving a volume of water approximately equal to one serving of beverage;
further comprising a mouth defined in the hood communicating with the fill water basin, a displaceable cover being displaceably retained on the hood relative to the mouth, and
wherein the cover is displaceably retained on the hood to rotatably cover and uncover the mouth.

7. The beverage making apparatus of claim 6, the at least two beverage substance holders including one holder for receiving and retaining a beverage substance pod, and one holder for receiving and retaining a beverage substance cartridge.

8. A beverage making apparatus comprising a body having a base with a hood portion extending from the body over at least a portion of the base, a heated water reservoir and a water pump communicating with the heated water reservoir being positioned in at least a portion of the body with a fill basin extending through at least a portion of the hood, and a spray head positioned in at least a portion of the hood and communicating with the heated water reservoir, the till water basin sized and dimensioned for receiving a volume of approximately equal to one serving of beverage, a pair of conductance probes positioned spaced apart in the fill basin in a generally horizontal orientation; a controller associated with the brewer and coupled to the conductance probes to detect a condition of water in the basin and to the water pump for controllably moving water from basin to the reservoir to displace heated water from the reservoir for dispensing through the spray head; at least two beverage substance holders provided with the beverage making apparatus for selective attachment to and removal from the hood relative to the spray, one at a time, each of said beverage substance holders retaining at least one different beverage making substance format, one at a time.

9. A beverage making apparatus comprising:
a body with a hood portion extending from the body;
a water heating and dispensing system for receiving water, heating the water, and dispensing the water for use in making a beverage;
at least two beverage substance holders provided with the beverage making apparatus for selective attachment to and removal from the hood portion, one at a time, each of said beverage substance holders retaining at least one different beverage making substance format, one at a time, and for receiving heated water into the beverage making substance for producing a beverage therefrom;
wherein the at least two beverage substance holders including one holder for receiving and retaining a beverage substance pod, and one holder for receiving and retaining a beverage substance cartridge, and
wherein the holder for receiving and retaining a beverage substance pod communicates directly with the water heating and dispensing system and the holder for receiving and retaining a beverage substance cartridge includes a structure which adapts the holder for use with a cartridge and includes at least one probe for piercing at least one portion of the cartridge for producing a beverage therefrom.

10. The beverage making apparatus of claim 9, further comprising a fill water basin being sized and dimensioned for receiving a volume of water approximately equal to one serving of beverage.

11. The beverage making apparatus of claim 9, further comprising a pair of conductance probes positioned spaced apart in the water heating and dispensing system to detect a condition of water for controllably moving water for use in making a beverage.

12. The beverage making apparatus of claim 10, further comprising measuring features, the features being positioned in the fill water basin for providing a visual indication of the volume of water placed in the basin.

13. The beverage making apparatus of claim 9, further comprising a mouth defined in the hood communicating with a till water basin, a displaceable cover being displaceably retained on the hood relative to the mouth.

14. A beverage making apparatus comprising:
a body with a hood portion extending from the body;
a water heating and dispensing system for receiving water, heating the water, and dispensing the water for use in making a beverage;

at least two beverage substance holders provided with the beverage making apparatus for selective attachment to and removal from the hood portion, one at a time, each of said beverage substance holders retaining at least one different beverage making substance format, one at a. time, and for receiving heated water into the beverage making substance for producing a beverage therefrom;

further comprising a mouth d.efined in the hood communicating with a fill water basin, a displaceable cover being displaceably retained on the hood relative to the mouth, and wherein the cover is displaceably retained on the hood to rotatably cover and uncover the mouth.

15. A beverage making apparatus comprising:

a body having a base with a hood portion extending from the body over at least a portion of the base;

a water heating and dispensing system positioned in at least a portion of the body for receiving water, heating the water, and dispensing the water;

a first beverage substance holder configured to hold and puncture a pre-packaged beverage brewing cartridge and configured for selective attachment to and removal from the beverage making apparatus;

a second beverage substance holder configured to hold a beverage brewing pod manufactured of a filter material which allows water to flow through, the second beverage substance holder configured for selective attachment to and removal from the beverage making apparatus, and wherein the second beverage substance holder communicates directly with the water heating and dispensing system and the first beverage substance holder includes a structure which adapts the holder for use with cartridge and includes at least one probe for piercing at least one portion of the cartridge for producing a beverage therefrom.

* * * * *